(12) United States Patent
Anderson

(10) Patent No.: US 12,426,602 B2
(45) Date of Patent: *Sep. 30, 2025

(54) DOUGH DIVIDING SYSTEMS

(71) Applicant: RADCO INFUSION TECHNOLOGIES, LLC, Toledo, OH (US)

(72) Inventor: Rick Anderson, Toledo, OH (US)

(73) Assignee: Insitu Foods, Inc., Toledo, OH (US)

( * ) Notice: Subject to any disclaimer, the term of this patent is extended or adjusted under 35 U.S.C. 154(b) by 895 days.

This patent is subject to a terminal disclaimer.

(21) Appl. No.: 17/439,666

(22) PCT Filed: Mar. 24, 2020

(86) PCT No.: PCT/US2020/024460
§ 371 (c)(1),
(2) Date: Sep. 15, 2021

(87) PCT Pub. No.: WO2020/198225
PCT Pub. Date: Oct. 1, 2020

(65) Prior Publication Data
US 2022/0151245 A1    May 19, 2022

Related U.S. Application Data

(63) Continuation of application No. 16/367,543, filed on Mar. 28, 2019, now Pat. No. 11,395,498.

(51) Int. Cl.
*A21C 5/00* (2006.01)
*A21C 11/10* (2006.01)

(52) U.S. Cl.
CPC ............ *A21C 5/00* (2013.01); *A21C 5/006* (2013.01); *A21C 11/10* (2013.01)

(58) Field of Classification Search
CPC ........... A21C 5/00; A21C 5/006; A21C 11/10; A21C 15/00
(Continued)

(56) References Cited

U.S. PATENT DOCUMENTS

| 3,349,438 A | 10/1967 | Baker et al. |
| 4,350,710 A | 9/1982 | Sundermann |

(Continued)

FOREIGN PATENT DOCUMENTS

| GB | 1540016 A | 2/1979 |
| JP | 02207735 A * | 8/1990 |

(Continued)

OTHER PUBLICATIONS

TW M465013 U (Lin Jin-Yuan) Nov. 11, 2013 [retrieved on Oct. 4, 2025]. Retrieved from Foreign Image and Text database, translation by Clarivate Analytics. (Year: 2013).*

(Continued)

*Primary Examiner* — Steven W Crabb
*Assistant Examiner* — Dilnessa B Belay
(74) *Attorney, Agent, or Firm* — Dinsmore & Shohl LLP

(57) ABSTRACT

A dough dividing system is disclosed including a hopper for receiving dough and a divider assembly. The hopper includes a hopper inlet and a hopper outlet. The divider assembly includes a divider block having a divider block cavity, and a first actuator operable to move the divider block between a first position in which the divider block cavity is positioned under the hopper outlet, and a second position in the divider block cavity is positioned over a receptacle inlet. Dough enters the divider block cavity when the divider block cavity is in the first position and the dough is sheared as the divider block moves to the second position.

19 Claims, 8 Drawing Sheets

(58) Field of Classification Search
USPC .......................................................... 99/537
See application file for complete search history.

(56) References Cited

U.S. PATENT DOCUMENTS

| | | | | |
|---|---|---|---|---|
| 5,270,070 | A | * | 12/1993 | Campbell ............... A21C 11/16 |
| | | | | 426/503 |
| 5,340,599 | A | | 8/1994 | Maruyama et al. |
| 5,350,290 | A | * | 9/1994 | Honings ................... A21C 5/00 |
| | | | | 425/464 |
| 5,503,861 | A | * | 4/1996 | Atwood .................... A21C 5/00 |
| | | | | 425/238 |
| 5,505,970 | A | * | 4/1996 | Morikawa ................ A21C 3/02 |
| | | | | 425/141 |
| 6,303,168 | B1 | | 10/2001 | Campbell |

FOREIGN PATENT DOCUMENTS

| | | | |
|---|---|---|---|
| JP | H02207735 A | | 8/1990 |
| TW | 465013 U | * | 11/2013 |

OTHER PUBLICATIONS

Machine translation of JP H02207735.

\* cited by examiner

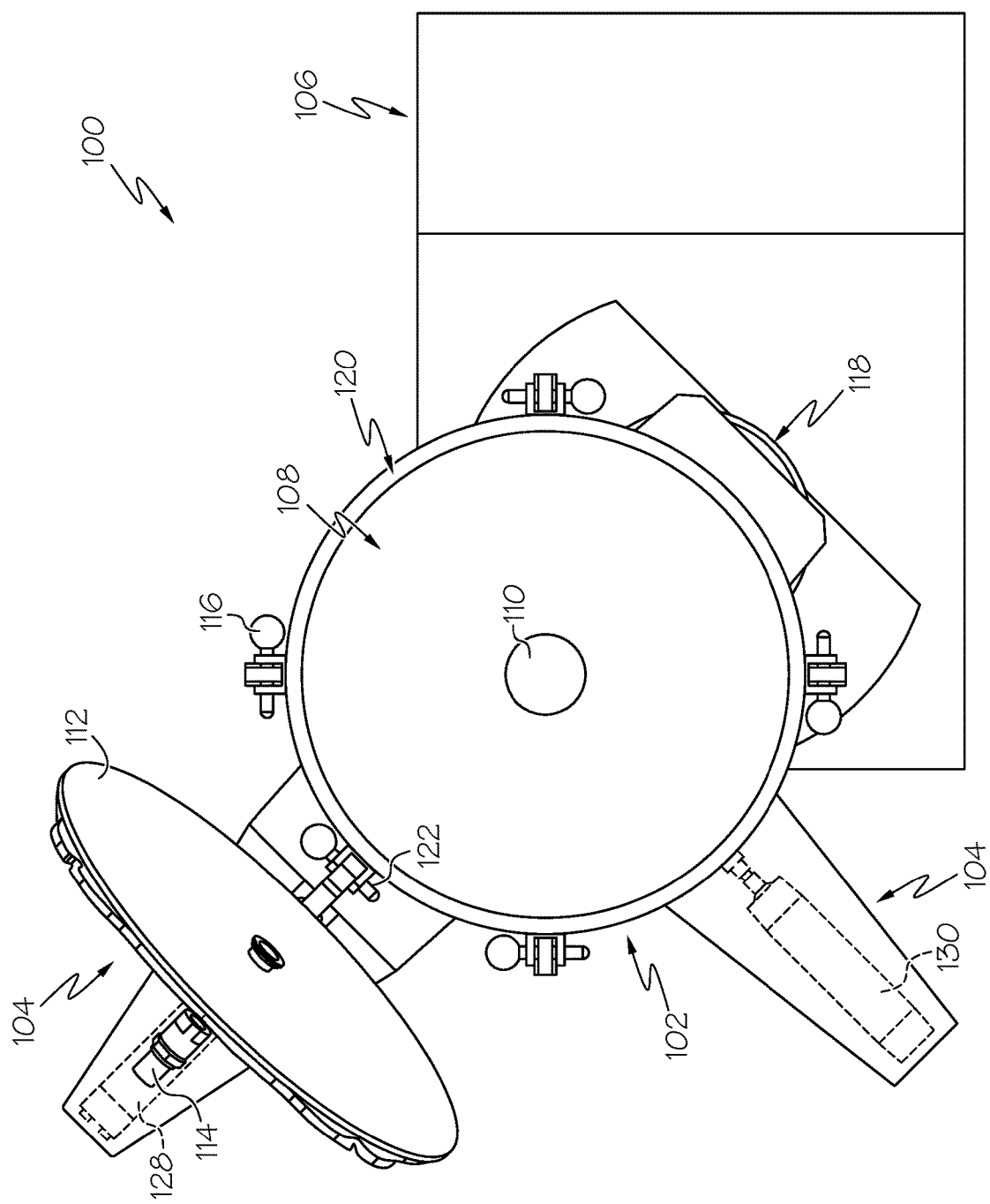

DOUGH DIVIDING SYSTEMS

CROSS-REFERENCE TO RELATED APPLICATION

This application is a PCT application which claims priority to co-pending U.S. Non-Provisional patent application Ser. No. 16/367,543, filed Mar. 28, 2019, for "Dough Divider Assembly," which is hereby incorporated by reference in its entirety including the drawings.

TECHNICAL FIELD

The present specification generally relates to systems and methods for dividing dough, and more specifically, to systems and methods for dividing dough using a dough divider with a divider assembly.

BACKGROUND

Baking bread requires the heating of dough. Dough is formed from various raw products (e.g., flour, yeast, salt, etc.). Many variables affect the production quality of baked bread and to produce bread of consistent quality and quantity, these variables must be controlled. Examples of aspects that must be controlled include dough composition and ingredient quality, dough temperature and age, ambient temperature and humidity, process and processing times, and various other factors. Engineering dough forming assemblies that can consistently produce dough with uniform composition and dimensions require precise control of these variables.

It may be more efficient to mix dough constituents into a large constituent mass of dough rather than in individually sized amounts. Therefore, individual amounts of dough (i.e., dough forms) must be separated from the constituent mass before baking individual bread loaves. To bake individual bread loaves of consistent size, dough forms of consistent size must first be formed. To separate small amounts of dough from a larger amount of dough with consistency, systems and methods for producing dough forms may be desired.

SUMMARY

In one embodiment, a dough dividing system includes a hopper for receiving dough and a divider assembly. The hopper includes a hopper inlet and a hopper outlet. The divider assembly includes a divider block having a divider block cavity, and a first actuator operable to move the divider block between a first position in which the divider block cavity is positioned under the hopper outlet, and a second position in the divider block cavity is positioned over a receptacle inlet. Dough enters the divider block cavity when the divider block cavity is in the first position and the dough is sheared as the divider block moves to the second position.

In another embodiment, a dough divider assembly includes a divider block having a divider block cavity, and a first actuator operable to move the divider block between a first position in which the divider block cavity is aligned with a hopper outlet to receive dough, and a second position in which the divider block cavity is aligned with a receptacle inlet. Dough in the divider block cavity is separated from dough in a hopper as the divider block cavity moves from the first position to the second position.

In yet another embodiment, a method of dividing dough into dough forms includes feeding a divider block cavity formed in a divider block with dough from a hopper, actuating a first actuator coupled to the divider block to move the divider block relative to the hopper outlet to separate the dough in the divider block from the dough in the hopper, actuating the first actuator to move the divider block such that the divider block cavity is aligned with a receptacle inlet of a receptacle, and pressurizing the divider block cavity to force the dough in the divider block cavity into a receptacle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 schematically depicts a top view of the dough dividing system of FIG. 1 according to one or more embodiments shown and described herein;

DETAILED DESCRIPTION

It may be necessary to produce dough in sufficient quantity with a specific size and shape for baking consistently marketable bread products. The size and shape of dough may affect the properties of baked bread. For example, the size and shape of the dough may affect the amount of time required to bake bread, the quality of bread baked using a given size/shape of dough form, and/or other bread properties. By shaping the dough into consistent sizes and shapes before the dough is baked, a consistent bread product can be produced on a mass scale given a consistent baking process.

Producing bread that is of consistently acceptable quality results in less waste of constituent products (e.g., yeast, flour, etc.), reduces the cost associated with purchasing constituent products, and reduces the overall cost of producing bread. Accordingly, systems and methods for producing consistently sized/shaped amounts of dough (i.e., dough forms) are required.

Figure 1:
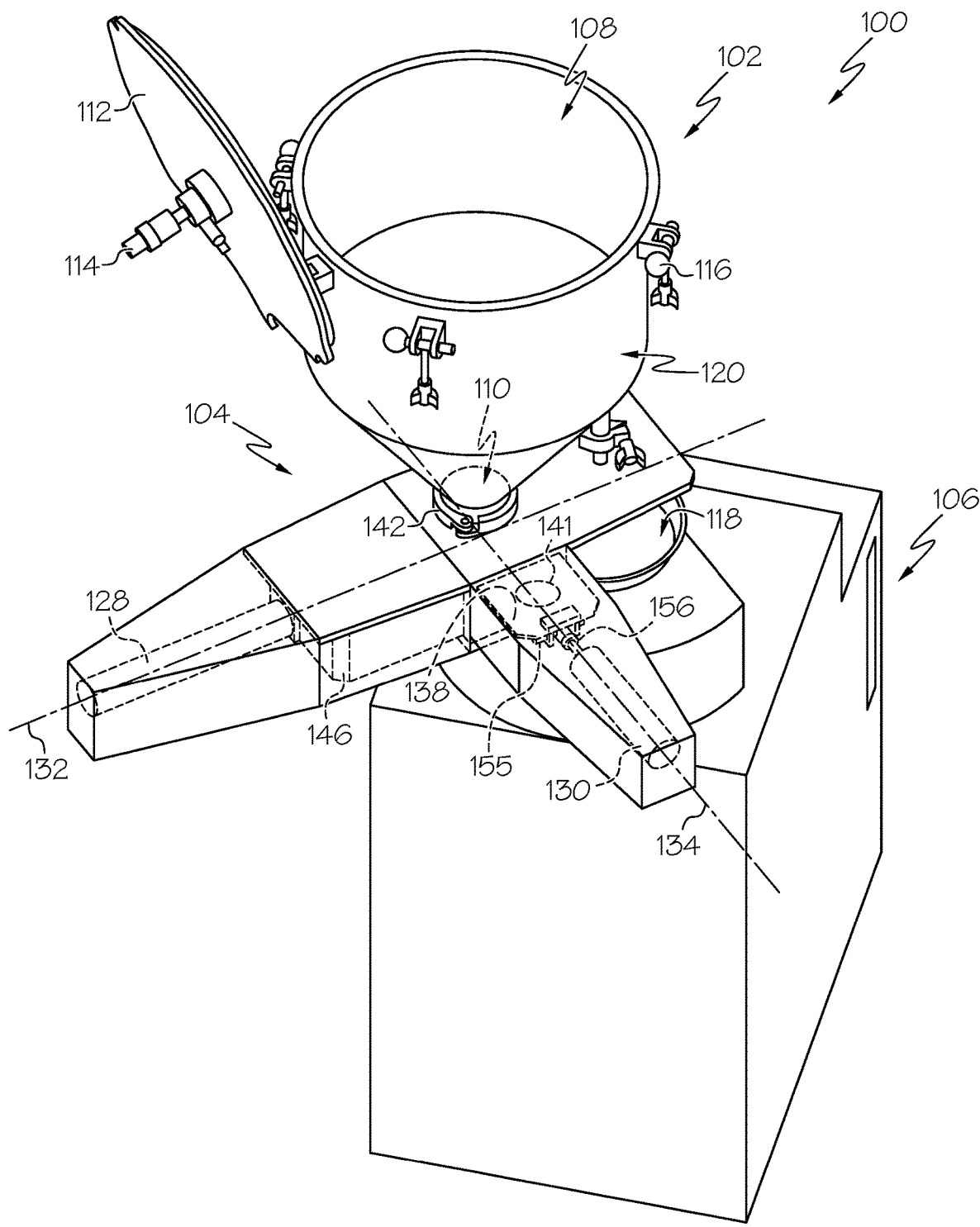
FIG. 1 schematically depicts a dough dividing system according to one or more embodiments shown and described herein.

Referring now to FIG. 1, a dough dividing system 100 is schematically depicted. The dough dividing system 100 generally includes a receiving assembly 102, a dough divider assembly 104, and a receptacle 106. In some embodiments, the receptacle 106 is, includes, or leads to a rotary dough shaper as described in U.S. patent application Ser. No. 16/367,466, which is hereby incorporated by reference in its entirety.

Figure 2:
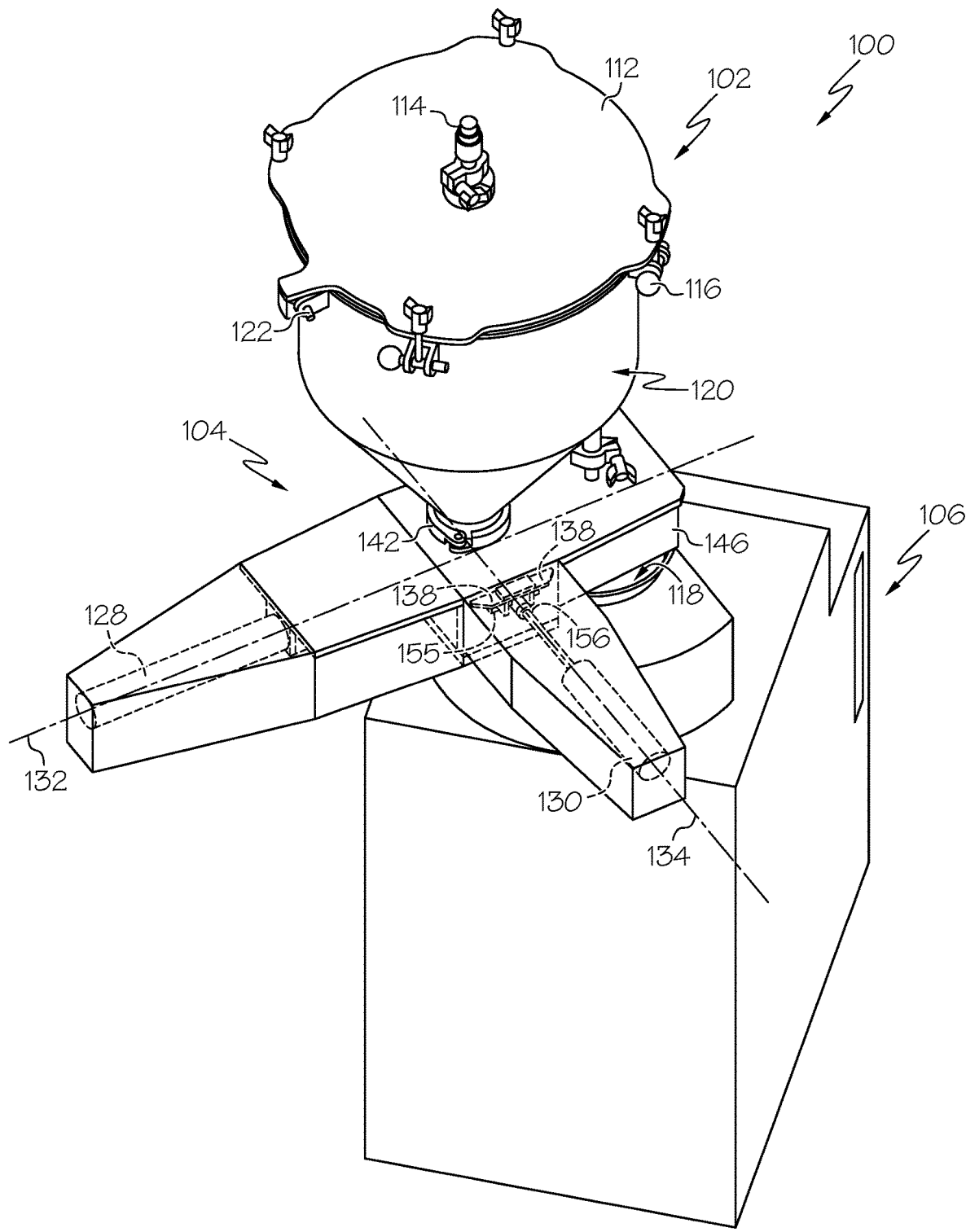
FIG. 2 schematically depicts the dough dividing system of FIG. 1 with a hopper cover in a closed position according to one or more embodiments shown and described herein.

Referring to FIGS. 1-3, the receiving assembly 102 includes a hopper 120 with a hopper inlet 108 and a hopper outlet 110, which may be positioned generally at the bottom of the hopper 120 such that contents placed within the hopper 120 tend to move toward the hopper outlet 110 based on the force of gravity and/or fluid pressure. The hopper 120 may be fluidly coupled to the divider assembly 104 at the hopper outlet 110 and be held in position with a clamp 142. The hopper inlet 108 may be covered by a hopper cover 112, which may include a pressurizing connection 114 for pressurizing the hopper 120 (using pressurized air, nitrogen, or some other inert gas, for example). In some embodiments, the hopper 120 may be pressurized between 0 pounds per square inch (psi) and 25 psi above atmospheric pressure. In some embodiments, the hopper 120 may be pressurized between 10 psi and 20 psi above atmospheric pressure, in some embodiments between 3 psi and 5 psi above atmospheric pressure, in some embodiments between 3 psi and 10 psi above atmospheric pressure, and in some embodiments between 5 psi and 15 psi above atmospheric pressure. While particular ranges of hopper pressure are disclosed herein, it is to be understood that such particular ranges are not limiting and that the hopper 120 may be pressurized to any suitable pressure. The hopper cover 112 may be sealed to the hopper 120 and held in place by one or more hopper cover couplings 116. A gasket (e.g., an O-ring or the like) (not shown) may be fitted between the hopper cover 112 and the hopper 120 to form an airtight seal such that the hopper 120 can be pressurized. As best shown in FIG. 2, the hopper cover 112 may be pivotable about a hopper cover pivot 122. The hopper cover 112 may pivot to open and close the hopper 120, thereby sealing dough inside the hopper 120. The hopper cover 112 may have any suitable geometry for concealing hopper inlet 108. In some embodiments, the hopper cover 112 has a domed geometry that may be either convex or concave with respect to the hopper inlet 108.

Still referring to FIGS. 1-4, the divider assembly 104 divides dough from a mass of dough that may be in the receiving assembly 102 into dough forms and feeds the dough forms into a receptacle inlet 118 of the receptacle 106. The size and shape of the dough forms described herein are not limited by this description and it is to be understood that dough may be formed from the mass of dough in the hopper 120 in any shape or size (e.g., a cylinder, a sphere, a disc, etc.). The divider assembly 104 includes a first actuator 128 and a second actuator 130. The first actuator 128 generally moves a divider block 146, which includes a divider block cavity 144 formed therein, from a first position under the hopper outlet 110 to a second position over the receptacle inlet 118 in a forward direction along a first axis 132 such that a portion of the dough in the hopper 120 is pushed into the receptacle 106 as a dough form. The first actuator 128 may then move the divider block 146 in a backward direction to the first position to receive more dough from the hopper 120. The process may repeat as needed to form additional dough forms. Operation of the first actuator 128 and the divider block 146 is described in greater detail herein.

Figure 4A:
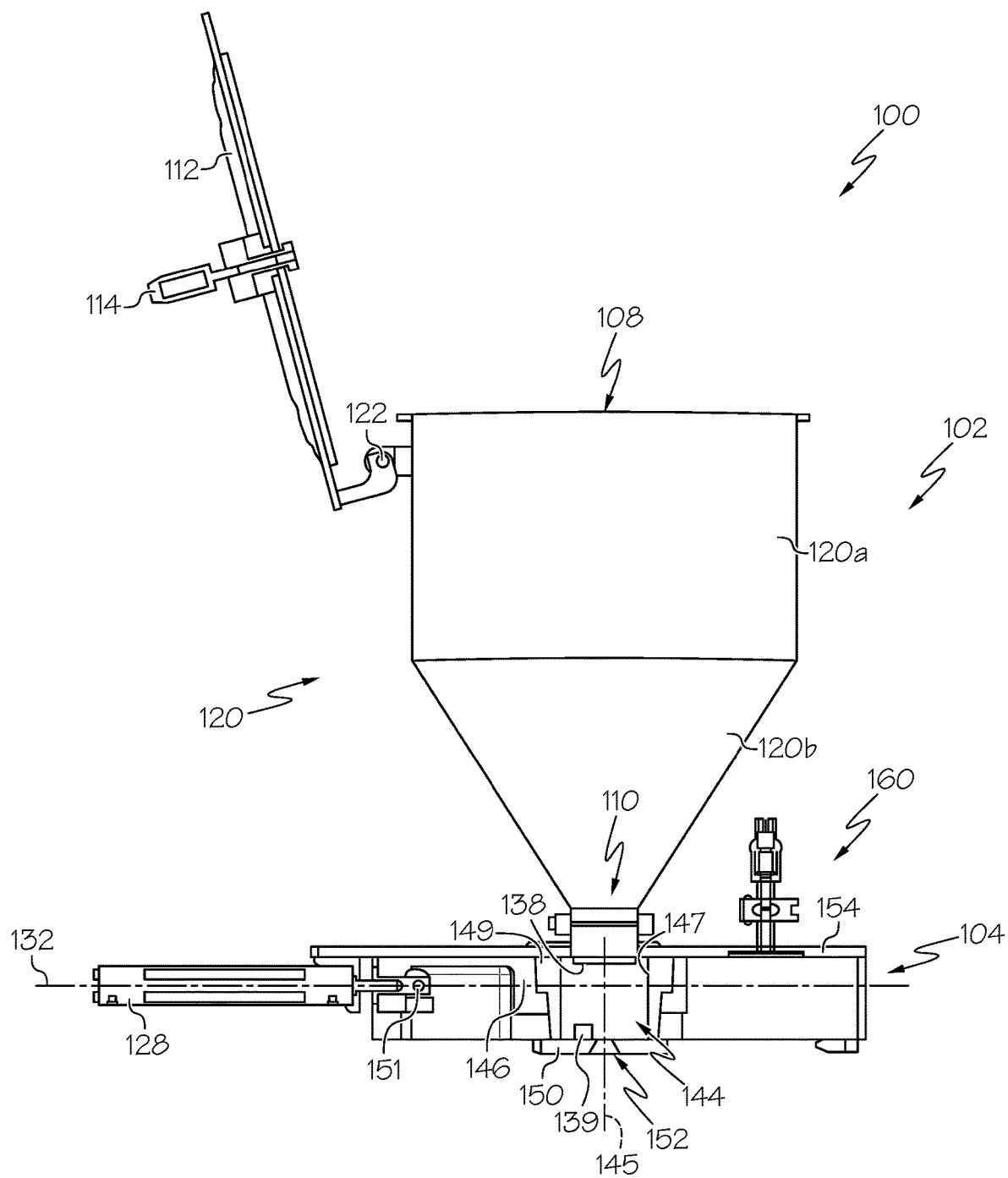
FIG. 4A schematically depicts a partial cross-sectional side view of the dough dividing system of FIG. 1 with a divider block in a first position according to one or more embodiments shown and described herein.
Figure 4B:
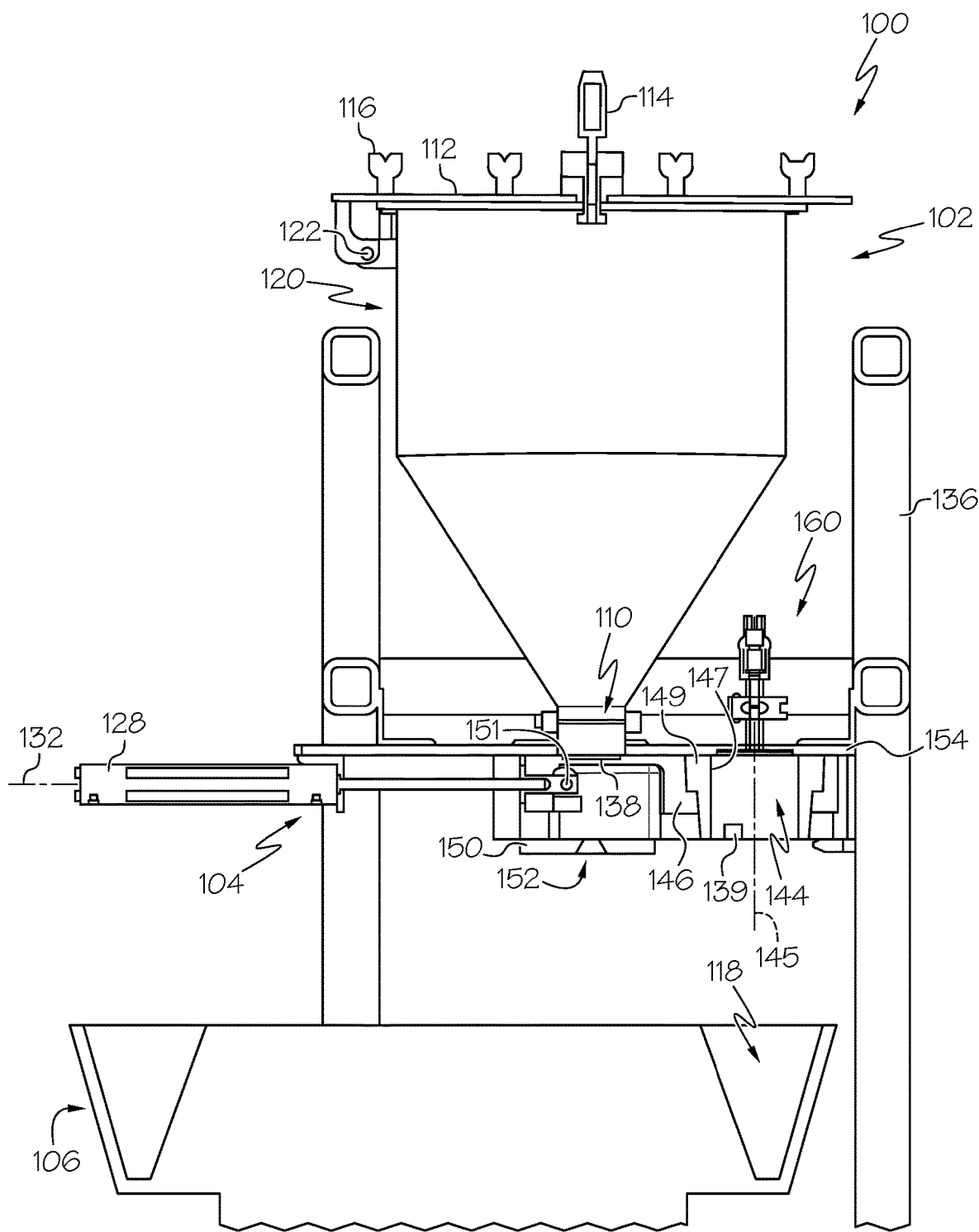
FIG. 4B schematically depicts a partial cross-sectional side view of the dough dividing system of FIG. 1 with the divider block in a second position according to one or more embodiments shown and described herein.

Referring now to FIGS. 4A and 4B, portions of the receiving assembly 102 and the divider assembly 104 are schematically illustrated as a cross-section taken along the first axis 132 of FIG. 1. As shown in FIG. 4B, the dough dividing system 100 may be supported by a support assembly 136. FIG. 4A shows the receiving assembly 102 including the hopper 120, the hopper cover 112, and the hopper cover pivot 122. The hopper cover 112 is shown in an open position, allowing a user to load or unload dough from the hopper 120 at the hopper inlet 108. The hopper 120 includes a cylindrical section 120a and a conical section 120b. An inner wall of the conical section 120b may guide dough toward the hopper outlet 110 as gravity and/or fluid pressure may cause dough to advance toward the hopper outlet 110. For example, in embodiments in which the hopper 120 is pressurized via the pressurizing connection 114, the dough may be pushed through the receiving assembly 102 based on fluid pressure. The hopper 120 may be pressurized by, for example, air, nitrogen, purified air, and sterile air.

In embodiments, dough leaves the hopper 120 and enters the divider block cavity 144. The divider block cavity 144 is a void formed in the divider block 146 defined by a divider block cavity wall 147 or a plurality of divider block cavity walls 147. In some embodiments, the divider block cavity 144 may be a cylindrical void surrounding a divider block cavity axis 145. In the first position, as shown in FIG. 4A, the divider block cavity axis 145 extending through a center of the divider block cavity 144 is aligned with the hopper outlet 110. In the second position, as shown in FIG. 4B, the divider block cavity axis 145 is aligned over the receptacle inlet 118 of the receptacle 106 such that dough can exit the divider block cavity 144 and enter the receptacle 106. The divider block 146 is mechanically coupled to the first actuator 128 and moves back and forth along the first axis 132 to move dough forms from the first position to the second position as described herein. The first actuator 128 may be, for example, a linear actuator, a hydraulic or pneumatic cylinder, a linear motor, or some other device for actuating linear motion. The divider block 146 may be made from a plastic (e.g., delrin, polypropylene, polyethylene, polystyrene, etc.), a metal or metal alloy, or some other material (e.g., wood). In some embodiments, the divider block 146 includes one or more weight saving features that may result in less energy being required to move the divider block 146.

A specific volume of dough may move from the hopper 120 to the receptacle 106. When the divider block 146 is in the first position, a divider bottom plate 150 is positioned beneath the divider block cavity 144 such that the divider bottom plate 150 and the divider block cavity wall 147 define a volume. In some embodiments, the divider bottom plate 150 may include a weep hole 152. The weep hole 152 is a discontinuity in the divider bottom plate 150 that extends from a bottom surface of the divider bottom plate 150, through a thickness of the divider bottom plate 150, to a top surface of the divider bottom plate 150. The weep hole 152 creates a fluid connection between the divider block cavity 144 and the atmosphere or some volume external to the divider block cavity 144 such that air or other fluid in the divider block cavity 144 can exit the divider block cavity 144 as dough enters the divider block cavity 144 from the hopper 120 when the divider block 146 is in the first position. In embodiments without the weep hole 152, air or other fluid may increase the pressure within the divider block cavity 144 as dough enters the divider block cavity 144 when the divider block 146 is in the first position. The weep hole 152 may relieve back pressure that would otherwise exist based on the dough displacing the air within the divider block cavity 144 which may otherwise reduce the flow of dough from the hopper 120 into the divider block cavity 144. Thus, the weep hole 152 functions as a vent allowing the free flow of dough into the divider block cavity 144 such that the divider block cavity 144 is vented to atmosphere to reduce the pressure within the divider block cavity 144 as it is filled with dough.

As shown in FIG. 4B, the weep hole 152 may have a conical shape having an opening formed at the bottom of the divider bottom plate 150 with a diameter larger than an opening formed at the top of the divider bottom plate 150, and a tapered profile therebetween. Accordingly, the portion of the weep hole 152 with a smaller-diameter top opening may be in contact with the dough, thus inhibiting dough from filling the weep hole 152 or escaping the divider block cavity 144 through the weep hole 152. Expanding the radius of the hole along a height of the weep hole 152, as shown, may decrease the resistance to the flow (e.g., air flow) along the height of the weep hole 152, which is along the divider block cavity axis 145 when the divider block 146 is in the first position.

Still referring to FIGS. 4A and 4B, the first actuator 128 may be selectively coupled to the divider block 146 at a pin connection 151. The pin connection 151 may selectively couple the first actuator 128 to the divider block 146 such that motion of the first actuator 128 affects motion of the divider block 146. It is contemplated that other types of connections may be used. For example, one or more portions of the first actuator 128 may be welded, screwed, bolted, or otherwise fastened to the divider block 146.

In some embodiments, the divider block cavity 144 may be pressurized by a divider pressurizer 160 when the divider block 146 is in the second position. The divider block cavity 144 may be pressurized using any inert, compressible fluid (e.g., air, nitrogen, etc.). In some embodiments, the divider block cavity 144 is pressurized by the divider pressurizer 160 at a pressure between 40 psi and 100 psi. In some embodiments, the divider pressurizer 160 may be operated between 50 psi and 80 psi. In some embodiments, the divider pressurizer 160 may be operated between 55 psi and 65 psi. In some embodiments, the divider block cavity 144 is not pressurized and dough forms fall from the divider block cavity 144 into the receptacle 106 due to the force of gravity alone. In some embodiments, the divider block cavity wall 147 may be lined with a particular coating (e.g., Teflon, Xylan, Tungsten Disulfide, etc.) that decreases adhesion and friction between dough in the divider block cavity 144 and the divider block cavity wall 147. In some embodiments, the divider block cavity wall 147 may be textured and/or include one or more features (e.g., bumps, etc.) to reduce the friction between dough and the divider block cavity wall 147. Any coating used to line the divider block cavity wall 147 is a non-toxic, food-safe coating.

Figure 4C:
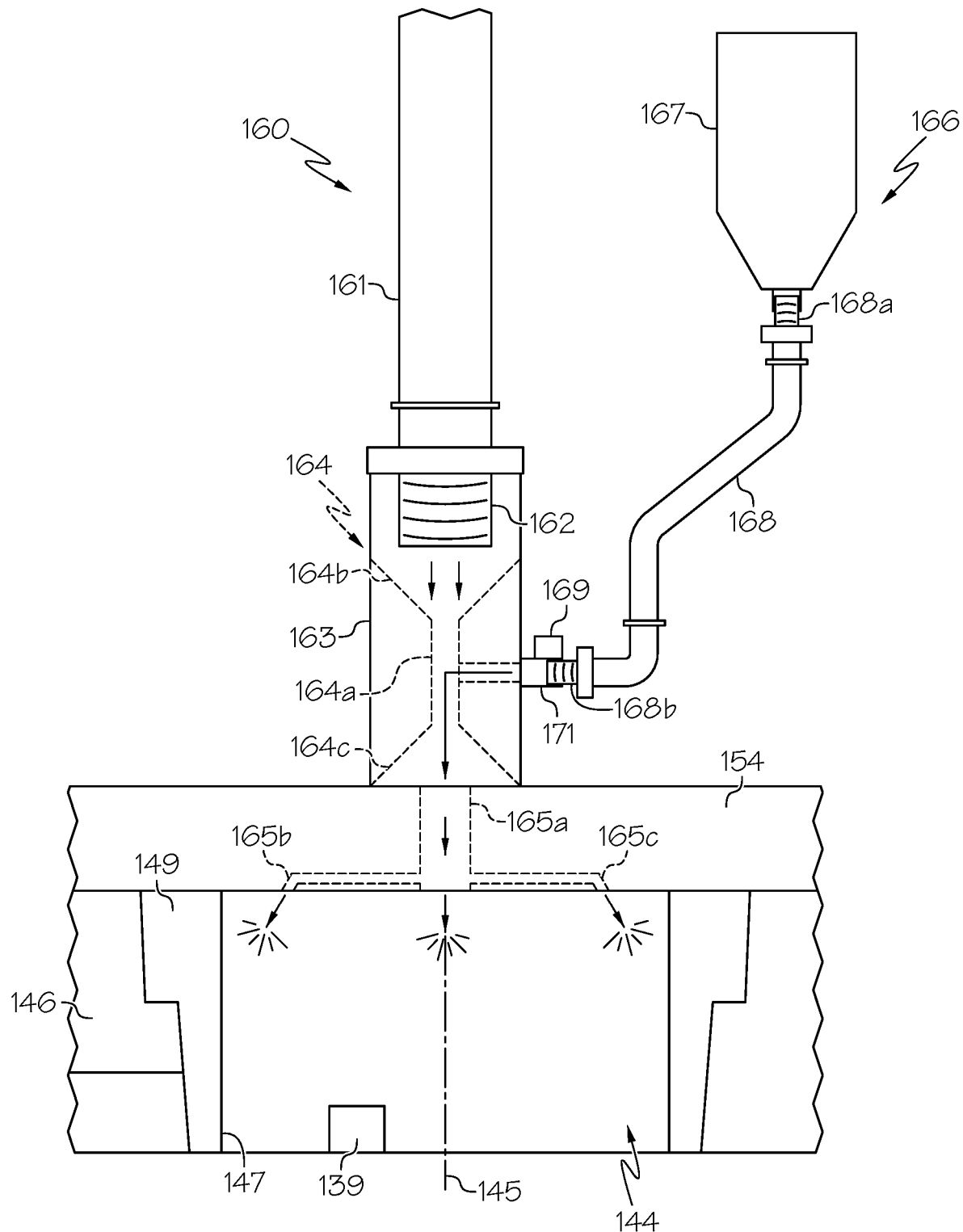
FIG. 4C schematically depicts an enlarged partial view of the dough dividing system of FIG. 1 in the second position and including a divider pressurizer and a lubrication system according to one or more embodiments shown and described herein.

As shown in more detail in FIG. 4C, an enlarged view of an embodiment of the divider pressurizer 160 is illustrated with the divider block 146 in the second position such that the divider block cavity axis 145 is aligned with the divider pressurizer 160. As shown, the divider pressurizer 160 includes a pressurizing fluid line 161 and a nozzle 162 for directing a pressurizing fluid into the divider block cavity 144 to blow dough out of an open bottom of the divider block 146 and into the receptacle inlet 118 of the receptacle 106. The nozzle 162 may be coupled to a chamber 163, which is coupled to the divider top plate 154. In some embodiments, the chamber 163 includes a Venturi tube 164 provided therein for increasing the flow of the pressuring fluid toward the divider block cavity 144. The Venturi tube 164 includes a reduced diameter portion 164a extending between a tapered top portion 164b and a tapered bottom portion 164c. In some embodiments, a central port 165a is formed through the divider top plate 154 extending from the chamber 163 and toward the divider block cavity 144. The central port 165a may terminate at the divider block cavity 144 for injecting the pressurizing fluid into the divider block cavity 144 along the divider block cavity axis 145 when the divider block 146 is in the second position.

In some embodiments, a plurality of circumferential ports 165b, 165c may extend from the pressurizing fluid line 161, the chamber 163, or the central port 165a, if provided, through the divider top plate 154, and terminate at the divider block cavity 144 to direct the pressurizing fluid into the divider block cavity 144 proximate the divider block cavity wall 147. The circumferential ports 165b, 165c may be directed into the divider block cavity 144 parallel to the divider block cavity axis 145 or may be angled, as shown, to be directed at the divider block cavity wall 147. By providing the plurality of circumferential ports 165b, 165c, dough is evenly pushed out of the divider block cavity 144 when the pressurizing fluid is injected into the divider block cavity 144 as opposed to a single location at a center of the dough, i.e., the central port 165a alone, along the divider block cavity axis 145. As shown, a pair of circumferential ports 165b, 165c are provided, however, it is to be appreciated that any suitable number of circumferential ports 165b, 165c may be formed in the divider top plate 154 and arranged in any suitable manner to effectively push the dough out of the divider block cavity 144.

As shown in FIG. 4C, in some embodiments, the dough dividing system 100 includes a lubrication system 166 for spraying a lubricant into the divider block cavity 144 and decreasing the friction between dough in the divider block cavity 144 and the divider block 146. In addition, applying lubricant to the divider block cavity 144 enables higher water content in the dough, which enhances the quality of the dough. The lubricant may be, for example, one or more of a food grade lubricant, a USP mineral oil for direct contact with food, a synthetic isoparaffinic hydrocarbon, and other substances generally recognized as safe for consumption. The lubrication system 166 may be a part of, i.e., in fluid communication with, the divider pressurizer 160 or may be separate therefrom, i.e., not in fluid communication. As shown, the lubrication system 166 is in fluid communication with the divider pressurizer 160 such that lubricant is drawn from the lubrication system 166 and injected into the divider block cavity 144 with the pressurizing fluid. In this embodiment, the lubrication system 166 includes a reservoir 167 coupled to a lubricant tube 168 at a first end 168a thereof and a nozzle 171 extending from the chamber 163 of the divider pressurizer 160 connected to a second end 168b of the lubricant tube 168. As the divider pressurizer 160 injects pressurizing fluid into the chamber 163 and through the reduced diameter portion 164a of the Venturi tube 164, the pressurizing fluid draws lubricant into the chamber 163 as well. Lubricant may be drawn into the chamber 163 due to the Venturi tube 164 and the force of gravity alone, or a pump 169 may be provided to force lubricant into the chamber 163. As lubricant enters the chamber 163, the pressurizing fluid mixes with the lubricant and simultaneously flows out of the divider pressurizer 160 and into the divider block cavity 144 through the central port 165*a* and/or the plurality of circumferential ports 165*b*, 165*c*, if provided. In embodiments in which the circumferential ports 165*b*, 165*c* are provided and angled toward the divider block cavity wall 147, the lubricant is applied directly onto the divider block cavity wall 147 to prevent friction between the next portion of dough entering the divider block cavity 144 and the divider block 146.

In some embodiments, as noted above, the lubrication system 166 may not be in fluid communication with the divider pressurizer 160. In this embodiment, the lubrication system 166 delivers lubricant directly to a plurality of ports, such as the circumferential ports 165*b*, 165*c*, formed in the divider top plate 154 and connected to the lubricant tube 168 for injecting lubricant alone into the divider block cavity 144, as opposed to being in fluid communication with the chamber 163 and premixed with the pressurizing fluid. Thus, it is to be appreciated that the dough dividing system 100 may include a central port and/or a plurality of circumferential ports (two, three, four, etc.) for injecting only pressurizing fluid into the divider block cavity 144, such as ports 165*a*, 165*b*, 165*c*, and a separate central port and/or a plurality of circumferential ports (two, three, four, etc.) for injecting only lubricant into the divider block cavity 144. This allows for better control over when lubricant may be injected into the divider block cavity 144. For example, as described in more detail herein, lubricant may be injected into the divider block cavity 144 at a predetermined number of cycles as opposed to being injected each time dough is pushed out of the divider block cavity 144 by the divider pressurizer 160.

When the divider pressurizer is activated, the dough is pushed out of the divider block cavity 144 in approximately 0.1 seconds. Thus, in some embodiments, the first actuator 128 may be actuated to move the divider block 146 back to the first position 0.1 seconds after actuation of the divider pressurizer 160 to quickly repeat the process without delay. In some embodiments, the first actuator 128 is delayed for an additional period of time such as, for example, 0.1 seconds after actuation of the divider pressurizer 160 to ensure that the lubricant has time to coat the divider block cavity wall 147 prior to the divider block 146 returning to the first position.

In some embodiments, the divider block 146 may include a modular insert 149 that may be inserted and/or removed from the divider block cavity 144 to affect one or more changes to the shape of the dough form created by the dough dividing system 100. That is, different modular inserts 149 may be insertable into a pocket of the divider block 146 to change one or more characteristics of the divider assembly 104. For example, one or more dimensions or aspects of the divider block cavity 144 may be changed. For example, a modular insert 149 may be positioned within the divider block 146 to change the size of the divider block cavity 144 and, thus, the size of the dough form that is transferred from the hopper 120 to the receptacle 106. In other embodiments, the modular insert 149 may have a shaped profile different than the cylindrical profile shown in FIGS. 4A and 4B may be inserted to change the shape of the dough forms transferred from the hopper 120 to the receptacle 106. Other aspects of the divider block cavity 144 may be changed with different modular inserts 149 and embodiments are not limited to the particular examples disclosed herein.

Still referring to FIGS. 4A and 4B, in some embodiments, the dough dividing system 100 may include one or more sensors 139 for determining the amount of dough within the divider block cavity 144 such that a dough form of sufficient size can be separated from the mass of dough in the hopper 120 and moved to the receptacle 106. For example, the dough dividing system 100 may include one or more weight sensors, visual sensors, or other types of sensors for determining an amount of dough within the divider block cavity 144 that are positioned within the divider block cavity 144. The dough dividing system 100 may be operated only when a predetermined amount of dough is provided within the divider block cavity 144 determined by the sensor 139.

Referring to FIGS. 1, 2, and 4A, some embodiments of the dough dividing system 100 include a blade 138. The blade 138 may be a flat, continuous blade that may be detachably coupled to the second actuator 130. In some embodiments, the blade 138 may include an aperture 141 that can be aligned with the hopper outlet 110 to allow dough to pass through the aperture 141 formed in the blade 138 such that the dough passes into the divider block cavity 144. In such embodiments, the second actuator 130 may actuate to move the blade 138 between a disengaged position in which the blade 138 allows dough to pass from the hopper 120 into the divider block cavity 144, and an engaged position in which a solid, flat portion of the blade 138 adjacent the aperture 141 blocks the hopper outlet 110 so that dough cannot pass through the blade 138 and into the divider block cavity 144. It is appreciated that, when the blade 138 is in the disengaged position, the blade 138 may be either positioned such that the aperture 141 of the blade 138 is aligned with the hopper outlet 110 or, alternatively, positioned such that the blade 138 is completely moved from under the hopper outlet 110 to allow dough to pass from the hopper 120 and into the divider block cavity 144.

In other embodiments, the blade 138 may be a unitary piece (i.e., without the aperture 141 extending through a thickness of the blade 138) such that the solid, flat portion of the blade 138 is either extended and blocking the hopper outlet 110 to prevent dough from entering the divider block cavity 144 when in the engaged position, or the blade 138 is retracted from the hopper outlet 110 to permit dough from entering the divider block cavity 144, when in the disengaged position. The blade 138 may slide between the hopper outlet 110 and the divider block cavity 144 along a second axis 134 to shear a top of the dough that has entered the divider block cavity 144 from the hopper outlet 110. The blade 138 thus slides between the engaged position and the disengaged position to shear dough.

When moving from the disengaged position to the engaged position, the blade 138 may shear the dough into a dough form, separating it from the dough mass in the hopper 120. Additionally, in some embodiments, the blade 138 may remain in the engaged position to vertically support the dough in the hopper 120 and prevent it from entering the divider block cavity 144 when the divider block 146 is in the first position. FIG. 1 shows the blade 138 attached to the second actuator 130, with the second actuator 130 in a retracted position and the blade 138 in the disengaged position. FIG. 2 shows the second actuator 130 in an extended position and the blade 138 in the engaged position. It is to be understood that, when the second actuator 130 is in the extended position, if the aperture 141 is present, the aperture 141 is not aligned with the hopper outlet 110 such that the blade 138 remains in the disengaged position. In the engaged position, the blade 138 may prevent dough from entering the divider block cavity 144 as well as prevent the over-pressurization of the divider block cavity 144 when the divider block cavity 144 is aligned beneath the hopper 120.

This may prevent dough from being forced out of the weep hole 152 in the divider bottom plate 150 and have other beneficial effects. In some embodiments, the blade 138 may prevent the dough from exiting the hopper 120 as the divider block 146 is actuated from the first position to the second position and back to the first position from the second position as explained in greater detail herein. Holding the dough in the hopper 120 and out of the path of the divider block 146 may reduce the amount of energy required to actuate the divider block 146, thereby reducing operation costs of the dough dividing system 100.

Not all embodiments include the blade 138. For example, in some embodiments, the dough is sheared by a divider top plate 154 of the divider assembly 104 as the first actuator 128 moves the divider block 146 from the first position (FIG. 4A) to the second position (FIG. 4B). The second actuator 130 may be, for example, a linear actuator, a hydraulic or pneumatic cylinder, a linear motor, or some other device for actuating linear motion.

Referring to FIGS. 1 and 2, the second actuator 130 may be selectively coupled to the blade 138 at a second pin connection 155. The blade 138 may include a coupling 156 for forming the second pin connection 155. The second pin connection 155 may selectively couple the second actuator 130 to the blade 138 such that motion of the second actuator 130 affects motion of the blade 138. It is contemplated that other types of connections may be used. For example, one or more portions of the second actuator 130 may be welded, screwed, bolted, or otherwise fastened to the blade 138.

Referring to FIGS. 1-3, 4A, and 4B, operation of the dough dividing system 100 is described. As shown in FIG. 4A, the divider block 146 may be positioned in the first position with the divider block cavity 144 beneath the hopper outlet 110. The blade 138 may be in a disengaged position as dough enters the divider block cavity 144 from the hopper 120. Dough may leave the hopper 120 and enter the divider block cavity 144 forced by gravity and/or pressure from the pressurizing connection 114. For example, the hopper 120 may be pressurized. In some embodiments, the hopper 120 is pressurized up to 15 psi. As the divider block cavity 144 is filled with dough, air within the divider block cavity 144 may be vented to the atmosphere through the weep hole 152, thereby reducing resistance to the flow of dough into the divider block cavity 144. Once the divider block cavity 144 is filled with a sufficient amount of dough, the second actuator 130 may actuate to engage the blade 138 to separate the dough in the divider block cavity 144 from the larger mass of dough in the hopper 120. Accordingly, a dough form may be separated from the larger mass of dough in the hopper 120. Some embodiments of the dough dividing system 100 may not include the blade 138 and the dough form may be sheared from the dough in the hopper 120 by the divider top plate 154 as the divider block 146 is actuated to the second position, as shown in FIG. 4B.

In embodiments, the size of the dough form is based on the shape and size of the divider block cavity 144, which is defined by the divider block cavity wall 147. It should be appreciated that the divider block cavity wall 147 may be a part of the modular insert 149, when provided. The dough dividing system 100 may automatically determine a level of dough within the divider block cavity 144 using the one or more sensors 139, for example, as described herein. It is to be understood that not all embodiments of the dough dividing system 100 include the sensor 139 for automatically determining a level of dough within the divider block cavity 144. In some embodiments, the divider block 146 may be in the first position for a predetermined amount of time before the dough dividing system 100 is actuated to move the divider block 146 to the second position such that the divider block cavity 144 fills with a sufficient amount of dough within the predetermined amount of time.

Once the divider block cavity 144 receives a sufficient level of dough, the divider block 146 moves from the first position to the second position, as shown in FIG. 4B. That is, the divider block cavity axis 145 may be aligned over the receptacle inlet 118 shown in FIG. 4B, which shows the divider block 146 over the receptacle inlet 118. With the divider block cavity 144 over the receptacle inlet 118, the divider block cavity 144 may be pressurized to force the dough form into the receptacle inlet 118 with the divider pressurizer 160. In some embodiments, dough may simply fall from the divider block cavity 144 into the receptacle inlet 118 based on the force of gravity. Once the divider block cavity 144 is empty, the first actuator 128 may actuate to pull the divider block 146 back to the first position and align the divider block cavity 144 with the hopper outlet 110.

In some embodiments, the blade 138 may remain in the engaged position while the divider block 146 moves from the first position to the second position. In the engaged position, the blade 138 may prevent the pressurization of the divider block 146 while it is moved from the second position to the first position. This may reduce the resistance to motion of the divider block 146.

Once the divider block 146 returns to the first position, the second actuator 130 may disengage the blade 138. Accordingly, the divider block cavity 144 may refill with dough from the hopper 120. The dough dividing system 100 may operate to create dough forms of uniform size and consistency from the large mass of dough in the hopper 120.

Figure 5:
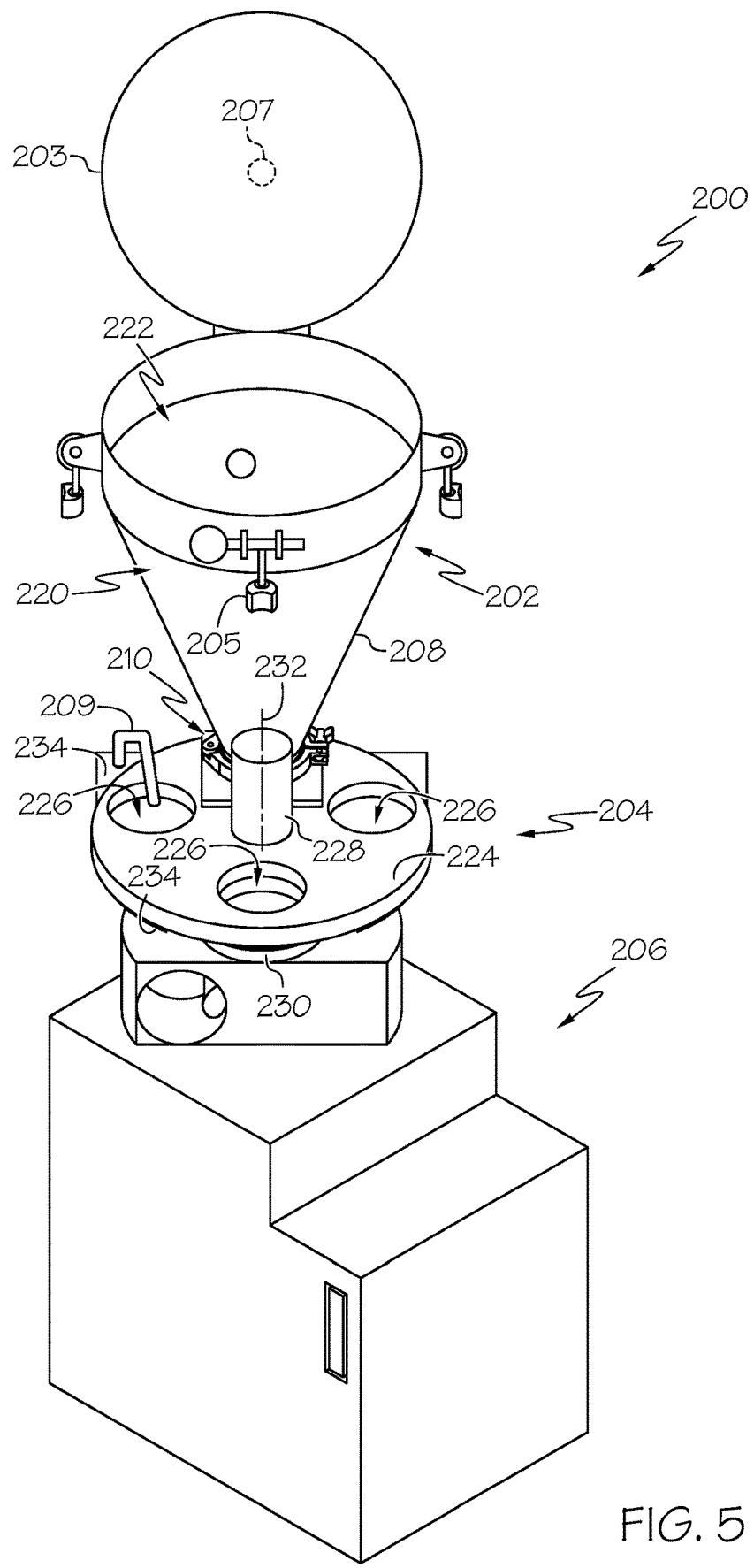
FIG. 5 schematically depicts a perspective view of a dough dividing system including a rotating divider block according to one or more embodiments shown and described herein.
Figure 6:
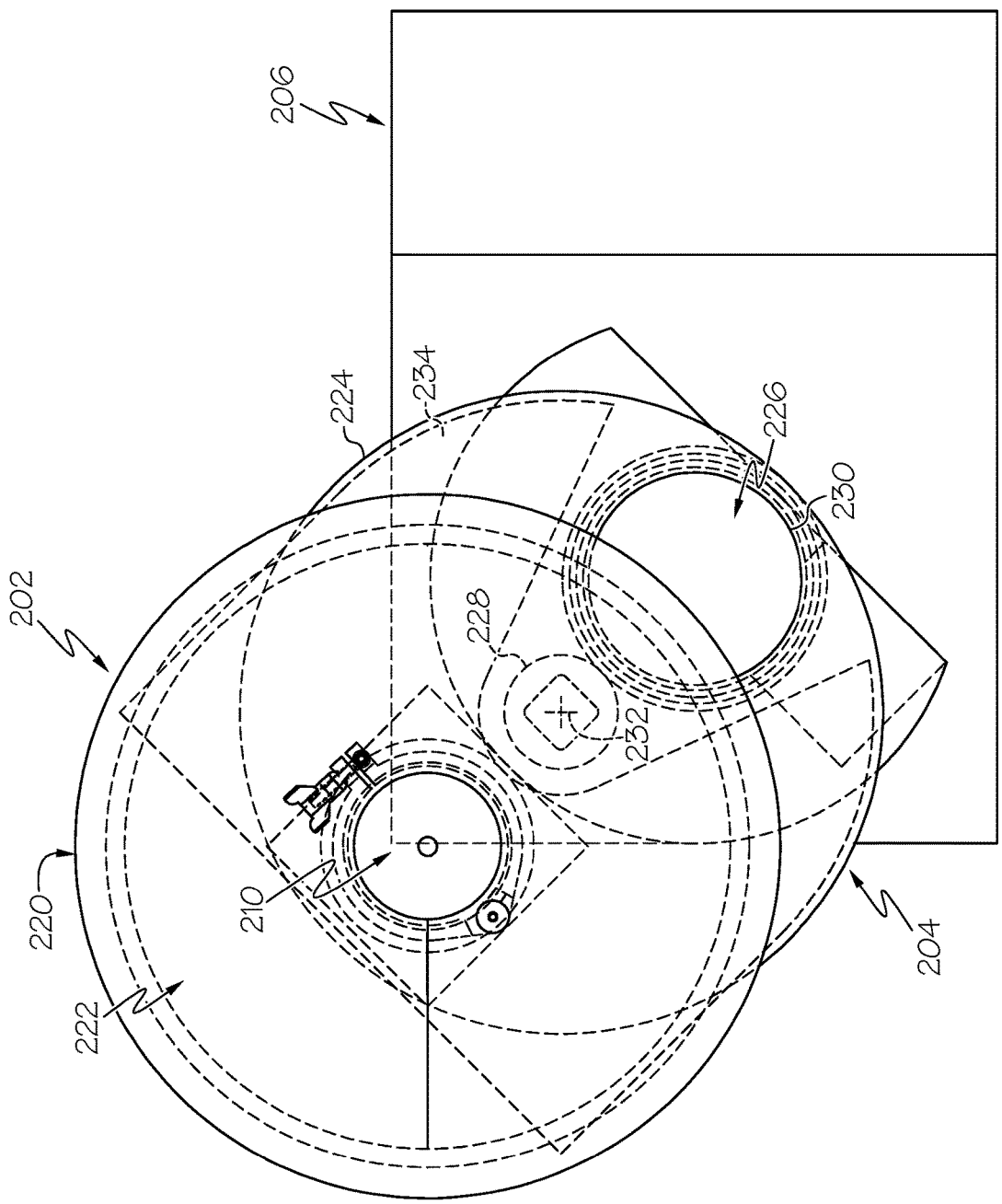
FIG. 6 schematically depicts a top view of the dough dividing system of FIG. 5 according to one or more embodiments shown and described herein.

Referring now to FIGS. 5 and 6, a dough dividing system 200 is shown. The dough dividing system 200 includes a receiving assembly 202, a dough divider assembly 204, and a receptacle 206. The receiving assembly 202 may include a hopper 220 with a hopper inlet 222 and a hopper outlet 210. Dough may be placed in the hopper 220 of the receiving assembly 202. The hopper 220 may have a conical profile 208 such that dough is directed toward the hopper outlet 210 by the force of gravity and/or pressure from a pressurizing system toward the hopper outlet 210. Similar to the receiving assembly 102 of the dough dividing system 100, the receiving assembly 202 may include a hopper cover 203 pivotally attached to the hopper 220, at least one hopper cover coupling 205 for securing the hopper cover 203 to the hopper 220, and a pressurizing connection 207 for pressurizing the hopper 220.

The divider assembly 204 of the dough dividing system 200 includes a divider block 224 that has a divider block cavity 226 formed therein. The divider block cavity 226 may be a void formed in the divider block 224 that may fill with dough via a connection with the hopper 220 at the hopper outlet 210. In some embodiments, a rotating actuator 228 rotates the divider block 224 about a first axis 232, which may be a vertical shearing axis, to move dough from a first position in which the divider block cavity 226 is positioned under the hopper outlet 210 to a second position in which the divider block cavity 226 is positioned above the receptacle inlet 230 of the receptacle 206. Thus, dough exits the hopper 220, fills the divider block cavity 226, and, upon actuation of the rotating actuator 228, the dough is sheared by the divider block 224. Dough may fall from the divider block cavity 226 into the receptacle inlet 230 when at least a portion of the divider block cavity 226 is above the receptacle inlet 230, as shown in FIG. 6.

Dough may enter the divider block cavity 226 from the hopper 220. In some embodiments, the hopper 220 may be pressurized as described herein. A user may actuate the divider block 224 using the rotating actuator 228 to cause the divider block 224 to rotate about the first axis 232 when dough is in the divider block cavity 226 to separate a portion of dough from the dough in the hopper 220. The rotating actuator 228 may be a motor or other actuator that is capable of rotating the divider block 224 about the first axis 232. The divider block 224 may rotate so that the divider block cavity 226 is positioned over the hopper outlet 210 to receive dough and continue to rotate to position the divider block cavity 226 over the receptacle inlet 230, where dough may exit the divider block cavity 226 and enter the receptacle 206. In embodiments, a separation plate 234 may extend beneath the divider block 224 and may prevent dough from exiting out of a bottom of the divider block cavity 226 until the divider block cavity 226 is above the receptacle inlet 230. The separation plate 234 may be fixed to the receptacle 206 such that the separation plate 234 may be fixed to the receptacle 206 such that the divider block 224 rotates relative to the separation plate 234.

In some embodiments, the dough dividing system 200 may include a lubrication system 209 for spraying a lubricant and decreasing the friction between dough in the divider block cavity 226 and the divider block 224. For example, embodiments of the lubrication system 209 may include an exemplary system for decreasing the friction between dough in the divider block cavity 226 and the divider block 224 that lubricates an internal surface or other surface of the divider block cavity 226 that may be in contact with dough. In some embodiments, the divider block 224 may include two or more divider block cavities 226 spaced apart from one another, as shown in FIG. 5. The divider block cavities 226 may be positioned under the hopper 220, over the receptacle inlet 230, and aligned with the lubrication system 209 for decreasing the friction between dough in the divider block cavity 226 and the divider block 224. In some embodiments, lubrication may be applied while the divider block cavity 226 is either below the hopper 220 or above the receptacle inlet 230. As shown in FIG. 5, an embodiment of the lubrication system 209 is shown extending from the separation plate 234 and directed toward one of the divider block cavities 226. However, it is to be appreciated that the lubrication system 209 may be provided on any other area of the dough dividing system 200.

In some embodiments, lubrication may be applied as the divider block 224 rotates around the first axis 232. For example, lubrication may be applied at one station or area relative to the divider assembly 204 as the divider block 224 rotates from above the receptacle inlet 230 to the hopper outlet 210. As noted herein, the divider block 224 may include more than one divider block cavity 226 (e.g., two, three, four, etc.). The number of divider block cavities 226 provided around the divider block 224 may be increased such that, at any one given time, dough can enter the divider block 224 at one divider block cavity 226, dough can exit the divider block 224 at a second divider block cavity 226, and a third divider block cavity 226 can be lubricated or otherwise prepared to reduce the friction between the divider block cavity 226 and dough. In some embodiments, the dough dividing system 200 may include a plurality of lubrication systems 209 for lubricating either one or a plurality of the divider block cavities 226, if provided. In some embodiments, the divider block cavity 226 may be lubricated during each rotation of the divider block 224. In other embodiments, the divider block cavity 226 may be lubricated after a predetermined number of cycles of the divider block 224 (e.g., every fourth rotation). In some embodiments, the divider block cavity 226 may be lubricated as it travels from the receptacle inlet 230 to the hopper outlet 210 (or vice-versa) such that the divider block cavity 226 does not stop at a particular station for lubricating the divider block 224. The lubricant may be, for example, one or more of a food grade lubricant, a USP mineral oil for direct contact with food, a synthetic isoparaffinic hydrocarbon, and other substances generally recognized as safe for consumption. In some embodiments, the lubricant may be applied using a spray, a spritzer, a brush, and any other type of applicator now known or to be discovered.

In some embodiments, the dough dividing system 200 may also include a divider pressurizer positioned over the receptacle inlet 230 and over the divider block cavity 226, similar to the divider pressurizer 160 discussed herein with respect to the dough dividing system 100. Further, in some embodiments, the dough dividing system 200 may include the lubrication system 209 or an additional lubrication system similar in structure to the lubrication system 166 discussed herein with respect to the dough dividing system 100, which may or may not be in fluid communication with the divider pressurizer 160 for injecting a lubricant into the divider block cavity 226 as dough is blown out of the divider block cavity 226.

One or more of the features or components described herein may be made from metals and alloys thereof, such as, for example, nickel, chromium, copper, or alloys thereof, or steel. While it is to be understood that not all of the features and components described herein are made from the same material, generally, the features and components that are capable of contacting edible materials (e.g., egg, yeast, flour, dough, bread, etc.) or other materials in contact with edible materials, may be made from one or more food-safe materials. For example, one or more of the features or components described herein that are capable of contacting edible materials or other materials that may contact edible materials may be made from or otherwise comprise type 304/2b stainless steel. For example, at least an internal lining of the hopper 120, 220 may be made from or otherwise comprise type 304/2b stainless steel or other food-safe material. In embodiments, one or more components of the divider assembly 104, 204 such as, for example, the components of the divider block cavity 144, 226 and/or the divider block cavity wall 147 may be made from or comprise type 304/2b stainless steel. In embodiments, the receptacle inlet 118, 230 may be made from or comprise type 304/2b stainless steel.

It should now be understood that the present disclosure is directed to dough being formed from a mass constituents and loaded into a hopper where it may be divided into multiple individual dough forms smaller than the mass of dough in the hopper. By using a systems as described herein, dough may be subjected to less stress, which may result in dough forms with a higher concentration of in-tact gluten structures, which may, among other advantages, be more readily shaped and molded. Additionally, dough with in-tact gluten structures may require little or no rest before it is molded, rounded, or shaped into balls or baked into bread. Thus, the amount of time needed to generate dough that is ready to be baked is minimized. Additionally, dough that is subjected to less stress during the formation process may not require the addition of additives such as a dough conditioner in order to meet acceptable molding criteria. Thus, fewer constituent products may be needed to form baked bread, reducing production costs, and increasing a desirability factor of the finished product.

Additionally, the dough divider assembly described herein can be used with dough having a relatively higher moisture content as compared to other types of dough dividers. The components of the assemblies described herein reduce production problems with relatively high moisture content dough, such as rapid agglomeration. The assemblies described herein may be less likely to be affected by flour clumping and, thus, require less frequent cleaning, suffer less downtime than other types of dough dividers, and increase the amount of dough that can be produced at a faster rate.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

EXAMPLES

Example 1. A dough dividing system comprising: a hopper for receiving dough, the hopper including a hopper inlet and a hopper outlet; and a divider assembly including: a divider block having a divider block cavity; and a first actuator operable to move the divider block between a first position in which the divider block cavity is positioned under the hopper outlet, and a second position in the divider block cavity is positioned over a receptacle inlet, wherein dough enters the divider block cavity when the divider block cavity is in the first position and the dough is sheared as the divider block moves to the second position.

Example 2. The dough dividing system of example 1, further comprising a divider pressurizer including at least one port positioned above the divider block cavity when the divider block is in the second position for directing a pressurizing fluid into the divider block cavity to push the dough out of the divider block cavity.

Example 3. The dough dividing system of any of examples 1 and 2, further comprising a lubrication system including at least one port positioned above the divider block cavity when the divider block is in the second position for directing a lubricant into the divider block cavity as the dough is pushed out of the divider block cavity.

Example 4. The dough dividing system of example 3, wherein the at least one port of the lubrication system is not in fluid communication with the at least one port of the divider pressurizer and wherein the at least one port of the lubrication system is directed at a divider block cavity wall defining the divider block cavity.

Example 5. The dough dividing system of example 3, wherein the divider pressurizer includes a chamber including a Venturi tube, the lubrication system includes a lubricant tube coupled to the Venturi tube for mixing pressurizing fluid and lubricant in the chamber and injecting the mixed pressurized fluid and lubricant simultaneously into the divider block cavity.

Example 6. The dough dividing system of any of examples 1-5, further comprising: a second actuator operable between an extended position and a retracted position; and a blade coupled to the second actuator and positionable between the divider block cavity and the hopper outlet when the divider block is in the first position and the second actuator is in the extended position.

Example 7. The dough dividing system of any of examples 1-6, wherein the hopper includes a hopper cover pivotally attached to the hopper and movable between an open position and a closed position to provide an airtight seal in the hopper.

Example 8. The dough dividing system of any of examples 1-7, wherein the hopper includes a pressurizing connection for pressurizing the hopper.

Example 9. The dough dividing system of example 8, wherein the pressurizing connection pressurizes the hopper to a pressure between 0 psi and 15 psi.

Example 10. The dough dividing system of any of examples 1-9, wherein a weep hole is formed in the divider assembly to vent the divider block cavity to atmosphere when the divider block is in the first position.

Example 11. A dough divider assembly comprising: a divider block having a divider block cavity; and a first actuator operable to move the divider block between a first position in which the divider block cavity is aligned with a hopper outlet to receive dough, and a second position in which the divider block cavity is aligned with a receptacle inlet, wherein dough in the divider block cavity is separated from dough in a hopper as the divider block cavity moves from the first position to the second position.

Example 12. The dough divider assembly of example 11, further comprising a modular insert, wherein the modular insert is configured to be removably inserted into the divider block to change one or more of a size and a shape of the divider block cavity.

Example 13. The dough divider assembly of any of examples 11 and 12, further comprising a blade, wherein the blade moves between an engaged position and a disengaged position to separate the dough in the divider block cavity from the dough in the hopper.

Example 14. The dough divider assembly of example 13, further comprising a second actuator operable to move the blade between the engaged position and the disengaged position.

Example 15. The dough divider assembly of example 14, further comprising a sensor configured to determine an amount of dough in the divider block cavity, wherein actuation of the first actuator and the second actuator is controlled based on a predetermined amount of dough in the divider block cavity determined by the sensor.

Example 16. The dough divider assembly of any of any of examples 11-15, wherein the divider block cavity includes a divider block cavity wall defining the divider block cavity, the divider block cavity wall having one or more features configured to reduce friction between the dough in the divider block cavity and the divider block cavity wall.

Example 17. The dough divider assembly of any of claims 11-15, wherein, when the divider block is in the second position, the divider block cavity is pressurized to force the dough in the divider block cavity out of the divider block cavity.

Example 18. The dough divider assembly of any of claims 11-15, wherein a weep hole is formed below the divider block cavity when the divider block cavity is in the first position to vent the divider block cavity to atmosphere.

Example 19. A method for dividing dough into dough forms comprising: feeding a divider block cavity formed in a divider block with dough from a hopper; actuating a first actuator coupled to the divider block to move the divider block relative to the hopper to separate the dough in the divider block from the dough in the hopper; actuating the first actuator to move the divider block such that the divider block cavity is aligned with a receptacle inlet of a receptacle; and pressurizing the divider block cavity to force the dough in the divider block cavity into a receptacle.

Example 20. The method of example 19, further comprising injecting a lubricant into the divider block cavity as the divider block cavity is pressurized.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A dough dividing system comprising:
 a hopper for receiving dough, the hopper including a hopper inlet and a hopper outlet; and
 a divider assembly including:
  a divider block having a divider block cavity;
  a first actuator operable to move the divider block between a first position in which the divider block cavity is positioned under the hopper outlet, and a second position in the divider block cavity is positioned over a receptacle inlet, and
 a divider pressurizer including at least one port positioned above the divider block cavity when the divider block is in the second position and configured to inject a pressurizing fluid into the divider block cavity to push the dough out of the divider block cavity;
 wherein the dough enters the divider block cavity when the divider block cavity is in the first position and the dough is sheared as the divider block moves to the second position.

2. The dough dividing system of claim 1, further comprising a lubrication system including at least one port positioned above the divider block cavity when the divider block is in the second position for directing a lubricant into the divider block cavity as the dough is pushed out of the divider block cavity.

3. The dough dividing system of claim 2, wherein the at least one port of the lubrication system is not in fluid communication with the at least one port of the divider pressurizer and wherein the at least one port of the lubrication system is directed at a divider block cavity wall defining the divider block cavity.

4. The dough dividing system of claim 2, wherein the divider pressurizer includes a chamber including a Venturi tube, the lubrication system includes a lubricant tube coupled to the Venturi tube for mixing pressurizing fluid and lubricant in the chamber and injecting the mixed pressurized fluid and lubricant simultaneously into the divider block cavity.

5. The dough dividing system of claim 1, further comprising:
 a second actuator operable between an extended position and a retracted position; and
 a blade coupled to the second actuator and positionable between the divider block cavity and the hopper outlet when the divider block is in the first position and the second actuator is in the extended position.

6. The dough dividing system of claim 1, wherein the hopper includes a hopper cover pivotally attached to the hopper and movable between an open position and a closed position to provide an airtight seal in the hopper.

7. The dough dividing system of claim 1, wherein the hopper includes a pressurizing connection for pressurizing the hopper.

8. The dough dividing system of claim 7, wherein the pressurizing connection pressurizes the hopper to a pressure between 0 psi and 15 psi.

9. The dough dividing system of claim 1, wherein a weep hole is formed in the divider assembly to vent the divider block cavity to atmosphere when the divider block is in the first position.

10. A dough divider assembly comprising:
 a divider block having a divider block cavity;
 a first actuator operable to move the divider block between a first position in which the divider block cavity is aligned with a hopper outlet to receive dough, and a second position in which the divider block cavity is aligned with a receptacle inlet, and
 a divider pressurizer including at least one port positioned above the divider block cavity when the divider block is in the second position and configured to inject a pressurizing fluid into the divider block cavity to push the dough out of the divider block cavity;
 wherein the dough in the divider block cavity is separated from dough in a hopper as the divider block cavity moves from the first position to the second position.

11. The dough divider assembly of claim 10, further comprising a modular insert, wherein the modular insert is configured to be removably inserted into the divider block to change one or more of a size and a shape of the divider block cavity.

12. The dough divider assembly of claim 10, further comprising a blade, wherein the blade moves between an engaged position and a disengaged position to separate the dough in the divider block cavity from the dough in the hopper.

13. The dough divider assembly of claim 12, further comprising a second actuator operable to move the blade between the engaged position and the disengaged position.

14. The dough divider assembly of claim 13, further comprising a sensor configured to determine an amount of dough in the divider block cavity, wherein actuation of the first actuator and the second actuator is controlled based on a predetermined amount of dough in the divider block cavity determined by the sensor.

15. The dough divider assembly of claim 10, wherein the divider block cavity includes a divider block cavity wall defining the divider block cavity, the divider block cavity wall having one or more features configured to reduce friction between the dough in the divider block cavity and the divider block cavity wall.

16. The dough divider assembly of claim 10, wherein, when the divider block is in the second position, the divider block cavity is pressurized to force the dough in the divider block cavity out of the divider block cavity.

17. The dough divider assembly of claim 10, wherein a weep hole is formed below the divider block cavity when the divider block cavity is in the first position to vent the divider block cavity to atmosphere.

18. A method for dividing dough into dough forms comprising:
 feeding a divider block cavity formed in a divider block with dough from a hopper when the divider block is in a first position, the hopper including a hopper inlet and a hopper outlet;
 actuating a first actuator coupled to the divider block to move the divider block relative to the hopper between a first position in which the divider block cavity is positioned under the hopper outlet, and a second position in which the divider block cavity is positioned over a receptacle inlet of a receptacle, shearing the dough in the divider block cavity from the dough in the hopper as the divider block moves to the second position; and pressurizing the divider block cavity using a divider pressurizer including at least one port positioned above the divider block cavity when the divider block is in the second position to inject a pressurizing fluid into the divider block cavity and push the dough out of the divider block cavity.

19. The method of claim 18, further comprising injecting a lubricant into the divider block cavity as the divider block cavity is pressurized.

\* \* \* \* \*